(12) United States Patent
Rao

(10) Patent No.: US 9,247,014 B1
(45) Date of Patent: Jan. 26, 2016

(54) METHODS, DEVICES, AND MEDIUMS ASSOCIATED WITH RECOMMENDING USER APPLICATIONS

(71) Applicant: INTELLECTUAL VENTURES FUND 79 LLC, Las Vegas, NV (US)

(72) Inventor: Abhijit Rao, Irvine, CA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 185 days.

(21) Appl. No.: 13/798,952

(22) Filed: Mar. 13, 2013

(51) Int. Cl.
*G06F 15/16* (2006.01)
*H04L 29/08* (2006.01)

(52) U.S. Cl.
CPC ........................... *H04L 67/22* (2013.01)

(58) Field of Classification Search
CPC .................................. H04L 67/2804
USPC ................................... 709/203, 204
See application file for complete search history.

(56) References Cited

U.S. PATENT DOCUMENTS

| | | | |
|---|---|---|---|
| 8,495,171 B1 * | 7/2013 | Potekhin et al. | 709/217 |
| 2010/0223578 A1 * | 9/2010 | Huberman et al. | 715/810 |

\* cited by examiner

*Primary Examiner* — Adnan Mirza
(74) *Attorney, Agent, or Firm* — Schwabe, Williamson & Wyatt

(57) ABSTRACT

A method, device, and/or medium may be associated with identifying user information associated with user behavior and generating keywords based, at least in part, on the user information. The keywords may be compared to metadata associated with user applications, and the user applications may be prioritized according to a correlation of the metadata with the keywords based, at least in part, on the comparison.

28 Claims, 10 Drawing Sheets

METHODS, DEVICES, AND MEDIUMS ASSOCIATED WITH RECOMMENDING USER APPLICATIONS

BACKGROUND

The total number of mobile applications available across the top smart-phone platforms in the world is quickly approaching one million. Many of the initial mobile applications were primarily created for entertainment purposes. However, as mobile application usage increases, the subject matter of the mobile applications has also changed. Mobile applications may be designed to improve lives, increase productivity, disseminate news, predict weather, and even provide crop data in places like rural India.

Industry distribution of mobile applications is growing faster than the rate of sales of digital music, which used to be the undisputed leader in online sales. The number of mobile applications is likely to continue growing, due to increased smart-phone usage around the world, and the availability of toolkits and frameworks that make it easier to develop new mobile applications. Known application search tools may allow a user to select a user application from the large number of available user applications. Additionally, the known search tools may be used to sort user applications based on the general popularity associated with a particular user application. Nevertheless, the selection of the user application may be very time consuming and inefficient, and the known search tools may not locate the user application that is best suited for the user.

DETAILED DESCRIPTION

As the number of user applications continues to increase, the ability of a user to select a relevant application of interest may become more time-consuming and less efficient over time. Furthermore, as more applications and categories of applications are made available, the sheer volume of options and choices of applications may make it difficult for the user to effectively sort through and/or distinguish one application from another. Some application stores may provide a user with a long list of applications which may be sorted based on a set of parameters, such as the number of downloads, the product release dates, and/or customer ratings. However, these parameters may be overly generic to a particular user, and may fail to provide information that the user would find relevant in making a selection of an application that meets the user's search criteria.

Not only is there a large volume of applications, but the applications may be used for a variety of purposes. Across all operating platforms, the top categories of mobile applications, in terms of number of application downloads, include: Entertainment 16.68%, Games 13.36%, Books 10.21%, Lifestyle 8.02%, Utilities 7.13%, Education 7.08%, Travel 4.84%, Business 3.76%, Reference 3.73%, Music 3.32%, Health & Fitness 3.28%, Productivity 3.09%, Sports 2.92%, News 2.85%, and Social Networking 2.71%.

The applications may be made available through one or more digital distribution platforms, which may be referred to as an "app store" or an "application store." Application stores may be associated with a device manufacturer, a service provider, an online retailer, etc., and the number of application stores continues to increase along with the demand for the applications.

Figure 1:
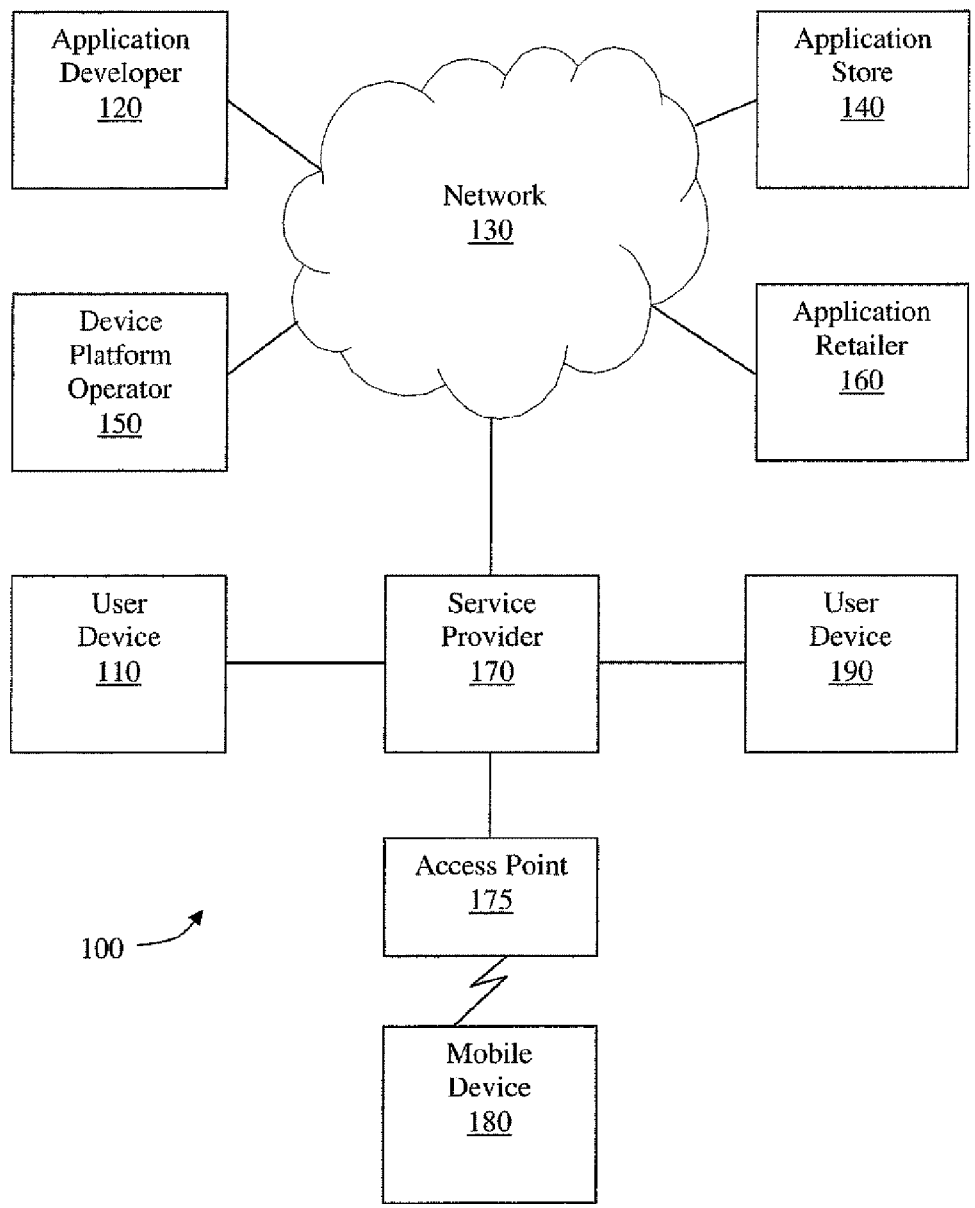
FIG. 1 depicts a block diagram of an example of a system configured to recommend user applications.

FIG. 1 depicts a block diagram of an example of a system 100 configured to recommend user applications. A service provider 170 may be operatively coupled to a network 130. Service provider 170 may be associated with one or more services, including data transfer, data storage, phone connectivity, communications, media delivery, financial transactions, entertainment, on-line services, wireless services, broadband services, network services, other types of services, or any combination thereof.

Network 130 may comprise a public network or a private network established for personal use, business use, governmental use, or any combination thereof. For example, network 130 may comprise a cable network, a satellite network, a cellular network, a telephone network, a broadband network, a voice over Internet protocol (VoIP) network, a content delivery/distribution network (CDN), or any combination thereof. Furthermore, network 130 may comprise a wired network, a wireless network, a local area network, a wide area network, the Internet, a virtual network, or any combination thereof.

Service provider 170 may be configured to communicate with one or more user devices, such as a user device 110, a second user device 190, and/or a mobile device 180. In some examples, service provider 170 may be operatively coupled to the one or more user devices via network 130 and/or an access point 175. Access point 175 may comprise a base station, a router, a gateway, a relay station, a cell phone tower, a modem, a small cell device, a Femtocell device, a home node, a wireless connectivity device, or any combination thereof. Service provider 170 may be configured to provide the one or more users with services associated with the selection, order, purchase, download, and/or delivery of a user application.

Service provider 170 may be configured to provide the one or more user devices with an application downloaded from an application provider. Additionally, service provider 170 may be operatively coupled to one or more application providers via network 130. The one or more application providers may comprise an application developer 120, an application store 140, a device platform operator 150, an application retailer 160, other types of application providers, or any combination thereof.

First user device 110, second user device 120, and/or mobile device 180 may comprise a laptop computer, a personal computer, a smart-phone, a tablet, a personal digital assistant (PDA), a hand-held device, a television, an entertainment system, an internet appliance, a smart appliance, other types of user devices, or any combination thereof. First user device 110, second user device 120, and/or mobile device 180 may be configured to run and/or process one or more user applications and/or mobile applications. Additionally first user device 110, second user device 120, and/or mobile device 180 may be configured to wirelessly communicate with service provider 170, other user devices, and/or one or more application providers.

System 100 may be configured to recommend user applications based on principles of big data analytics to identify applications of interest based, at least in part, on past experiences of one or more users. For example, system 100 may be configured to predict an application that the user will need based on the user's past experiences. System 100 may be configured to monitor, and/or otherwise obtain, user information associated with a user, such as information contained in, and/or associated with, mobile device 180.

By way of illustrative example, assume that mobile device 180 is located at an automotive repair shop, and a user wants to record some of the work being done on an automobile. The user may select a search tool for selecting an application related to providing, storing, and/or retrieving details of work performed on the automobile. The user may search for an application that maintains a log of automotive maintenance work and/or repairs.

While the user may have arrived at the automotive repair shop having already loaded an appropriate application into mobile device 180, this rarely happens. Instead the user may have to review potentially dozens if not hundreds of different applications listed on mobile device 180 while waiting at the automotive repair shop, which may restrict the amount of time that is available for reviewing and/or selecting an appropriate application. In some cases, the user may simply pick one of the applications at random, whether or not the selected application is in fact the best suited to the user's needs.

System 100 may be configured to obtain user information concerning the user, such as a location of mobile device 180, an appointment with the automotive repair shop that was scheduled on mobile device 180, and/or previous Internet searches conducted on mobile device 180 by the user to find the automotive repair shop. In some examples, system 100 and/or mobile device 180 may be configured to access and/or retrieve an appointment that was scheduled using another device, such that the user information may be obtained from two or more devices. The user information may be used to predict, infer, diagnose, and/or anticipate an application that the user may need. In some examples, the user information may comprise temporal information, current information, inferential information, diagnostic information, state information, and/or contemporaneous information associated with the user and/or with mobile device 180. Based on the user information, system 100 may be configured to recommend an application related to automotive maintenance. For example, the recommended application(s) may be automatically displayed to the user without the user having to enter any keywords. In some examples, system 100 may be configured to display one or more recommended applications without the user requesting a search.

User information may comprise information associated with where mobile device 180 is located, what the user is doing, how the user operates mobile device 180, how the user prefers to operate mobile device 180, what types of input modes the user prefers, what types of applications are already installed on mobile device 180, what events are scheduled on mobile device 180, the weather, a phone call log, an Internet browsing history, spoken words, other types of user properties and/or behavior, or any combination thereof. For example, a user waiting in line at a restaurant may receive recommendations for applications associated with a restaurant menu, a diet/fitness plan, a reservation service, a restaurant rating guide, and/or a local event calendar.

System 100 may be configured to cause mobile device 180 to display an application list in a view that is efficient to use and takes into consideration the user information obtained for the user. Additionally, a user's method of operation of mobile device 180 may have a contemporaneous effect on what applications system 100 may recommend to the user. For example, a user's inquiry as to information associated with a first application may cause the list of applications to be resorted to reflect the user's interest in the first application, even though the first application ultimately may not be selected for download.

A user application recommended to the user may be based on user information associated with a plurality of devices. For example, a plurality of devices may be associated with the user, and the user information may comprise cumulative information obtained from one or more of the plurality of associated devices. Additionally, user information associated with the user may be shared and/or combined as between one or more application providers. For example, a first application provider may use the user information to recommend a first application, and a second application provider may use the same user information to recommend a second application.

By helping the user efficiently identify the most relevant application, the user may be able to choose an application from a reduced number, yet more relevant set, of applications. Accordingly, the user may be more likely to find a suitable application quickly, and therefore may be more likely to use the search tool more frequently, which may result in the user downloading more applications.

Figure 2:
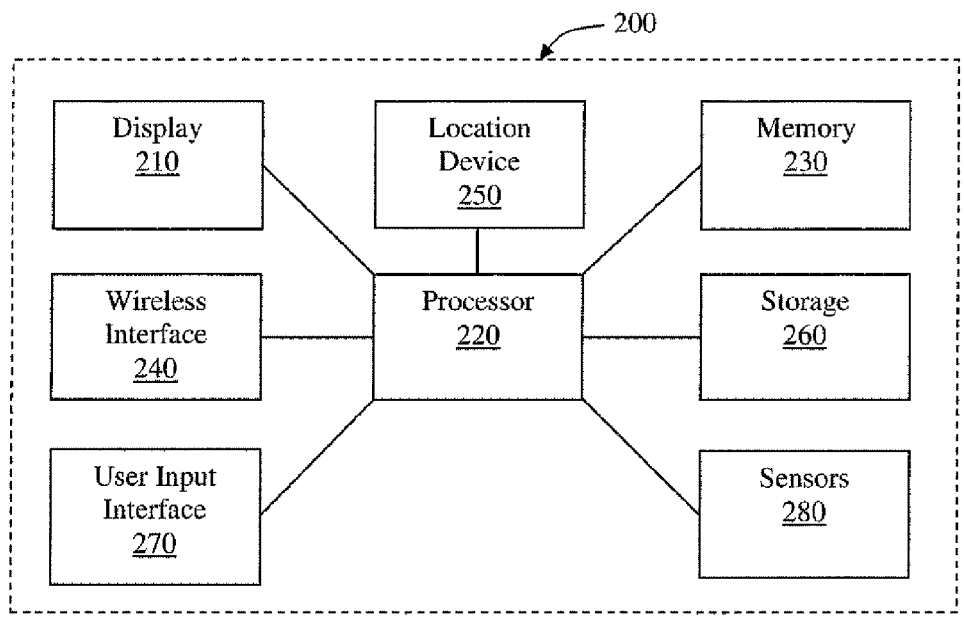
FIG. 2 depicts an example of an apparatus configured to process user applications.

FIG. 2 depicts an example of an apparatus 200 configured to process user applications. Apparatus 200 may comprise a processing device 220 operatively coupled to a display 210, a memory device 230, a wireless device interface 240, a location device 250, a storage device 260, a user input interface, and/or one or more sensors 280. User input interface 260 may comprise a keyboard, a scrolling mechanism, one or more buttons, a touch screen, a microphone, a camera, a motion detector, other types of user input devices, or any combination thereof. Sensors 280 may comprise one or more devices configured to detect sensory input. The sensory input may include temperature, elevation, planar level, kinematic, optical, acoustic, olfactory, somatic, other types of sensory input, or any combination thereof.

Wireless device interface 240 may comprise electronic circuits or programs configured to wirelessly transmit and/or receive information. In some examples, apparatus 200 may comprise a laptop computer, a personal computer, a smart-phone, a tablet, a PDA, a hand-held device, a television, an entertainment system, a wireless device, an internet appliance, a smart appliance, other types of electronic devices, or any combination thereof.

Memory device 230 may be configured to store instructions associated with an application program. Location device 250 may be configured to monitor, obtain, determine, and/or otherwise identify a location associated with apparatus 200. Storage device 260 may be configured to store user information associated with a user, and/or information associated with one or more user applications.

Processing device 220 may be configured to execute instructions stored in memory device 230. For example, processing device 220 may be configured to identify user information associated with user behavior. The user behavior may comprise the identification of one or more points of interest in proximity to apparatus 200.

Additionally, processing device 220 may be configured to generate keywords based, at least in part, on the user information. For example, the keywords may be associated with the one or more identified points of interest. The one or more points of interest may comprise a merchant located at, or near, where apparatus 200 is located.

Processing device 220 may be configured to compare the keywords to metadata associated with user applications. The keywords and/or the metadata may be stored in storage device 260. User applications may be prioritized according to a correlation of the metadata with the keywords based, at least in part, on the comparison. For example, a user application associated with one or more key words that share a high degree of similarity with terms used in the metadata may indicate that the user application is associated with a high priority. In some examples, a higher priority may be assigned to a user application associated with a merchant that is located proximate to apparatus 200. The metadata may comprise a tag that identifies the closest merchant, and the recommended user application may comprise a service provided by the merchant.

In some examples, the one or more points of interest may identify and/or comprise an electronic device/system, such as a consumer appliance, an industrial machine, a thermostat, a monitoring system, an entertainment system, or any combination thereof. The user application may be associated with a method of using the electronic device/system. Additionally, the keywords may identify the electronic device/system. In some examples, the electronic device/system may be associated with a category of goods, and the keywords may comprise the category of goods. Processing device 220 may be configured to cause the user application to be displayed on apparatus 200 in response to identifying that the electronic device/system is in proximity to apparatus 200.

By way of illustrative example, a consumer appliance such as a refrigerator may be located near apparatus 200. The consumer appliance may indicate that servicing is required, or that an inventory of goods, materials, and/or consumables is running low. Apparatus 200 may detect the state of the consumer appliance as being in need of service, and processing device 220 may be configured to identify one or more user applications associated with locating a service technician, ordering replacement parts, ordering a new consumer appliance, other types of applications, or any combination thereof. In some examples, apparatus 200 may be configured to communicate with one or more electronic devices/systems, including smart appliances.

Figure 3:
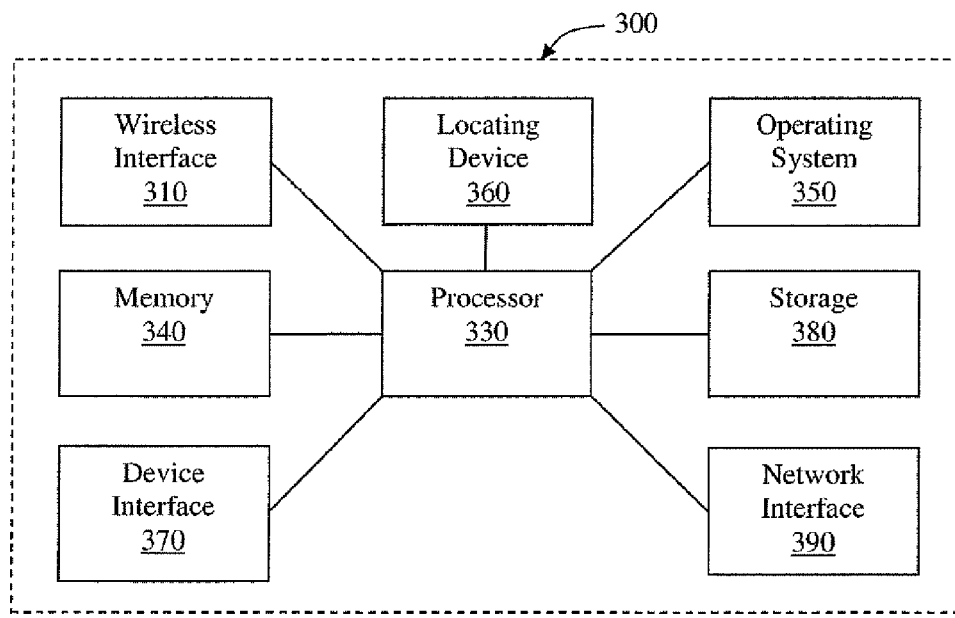
FIG. 3 depicts an example of an apparatus configured to provide user applications.

FIG. 3 depicts an example of an apparatus 300 configured to provide user applications. Apparatus 300 may comprise a processing device 330 operatively coupled to a wireless device interface 310, a memory 340, an operating system 350, a locating device 360, a device interface 370, a storage device 380, and/or a network interface 390. In some examples, apparatus 300 may comprise, or be operatively coupled with, a service provider, an application developer, an application publisher, an application store, a device platform operator, an application retailer, other types of application providers, or any combination thereof.

Wireless device interface 310 may comprise electronic circuits or programs configured to interface and/or wirelessly communicate with one or more wireless devices, such as a laptop computer, a smart-phone, a tablet, a PDA, a television, an entertainment system, a hand-held device, other types of wireless devices, or any combination thereof. Memory device 340 may be configured to store instructions associated with an application program. Processing device 330 may be configured to execute instructions stored in memory device 340. In some examples, processing device 330 may be configured to perform some or all of the operations described above with respect to service provider 170 (FIG. 1) and/or processing device 220 (FIG. 2).

Device interface 370 may comprise electronic circuits or programs configured to interface and/or communicate with one or more user devices, such as a laptop computer, a personal computer, a smart-phone, a tablet, a PDA, a hand-held device, a television, an entertainment system, other types of user devices, or any combination thereof. Network interface 390 may comprise a router, a gateway, a modem, or any combination thereof, which may be configured to connect apparatus 300 to one or more network devices and/or systems over a network.

Apparatus 300 may be configured to work in conjunction with apparatus 200 in providing a recommendation for a user application. In some examples, apparatus 200 may be configured to identify user information associated with user behavior and/or to generate keywords based, at least in part, on the user information. Apparatus 300 may be configured to compare the keywords to metadata associated with user applications and/or to prioritize the user applications according to a correlation of the metadata with the keywords based, at least in part, on the comparison. Additionally, apparatus 300 may be configured to receive the user information and/or the keywords from apparatus 200, and to transmit a listing of recommended applications to apparatus 200 based on the prioritization.

Figure 4:
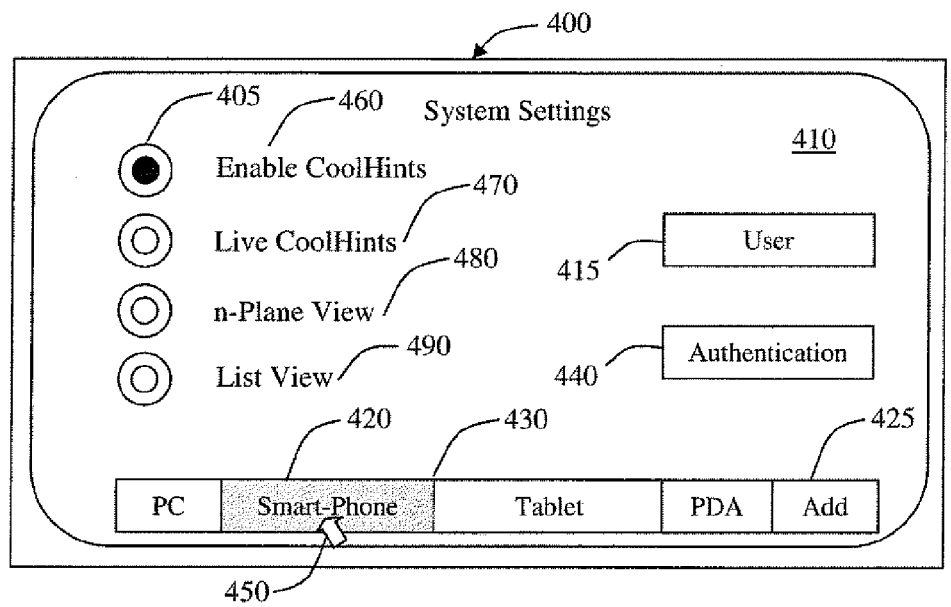
FIG. 4 depicts an example of a user interface for a system configured to recommend user applications.

FIG. 4 depicts an example of a user interface 400 for a system configured to recommend user applications. User interface 400 may be displayed by a display device 410 which may comprise a television, a monitor, a smart-phone, a plasma screen, a LCD screen, a projection screen, other types of display devices, or any combination thereof. One or more controllers may be configured to provide user control of display device 410, or to utilize display device 410 as a user interface for operating a user application.

User interface 400 may be configured to display system settings, such as an enable setting 460, a live update setting 470, a spatial view setting 480, and/or an application list setting 490. The system settings may be associated with one or more selection controls 405. In some examples, more than one of the selection controls 405 may be concurrently selected and/or enabled.

Enable setting 460 may be configured to enable and/or activate a system for recommending user applications. The application recommendation system may be installed on a user device as an application search tool. Live update setting 470 may be configured to allow the application recommendation system to continuously monitor, retrieve, and/or update user information associated with a user, even when the user is not explicitly requesting a search of user applications.

The user may enable the device for certain activities and/or types of usage, and disable the device for other types of activities and/or types of usage. In some examples, user interface 400 may comprise different settings for the same device. A first setting may be associated with the device during work related activities, and a second setting may be associated with the device during private activities. For example, enable setting 460 may be disabled for private activities. The first setting and second setting may be set according to the location associated with the device. For example, usage of the device at the user's home may be considered private, in which case enable setting 460 may be disabled, and usage of the device at the user's place of business may be considered to be work related, in which case enable setting 460 may be enabled.

Figure 12:
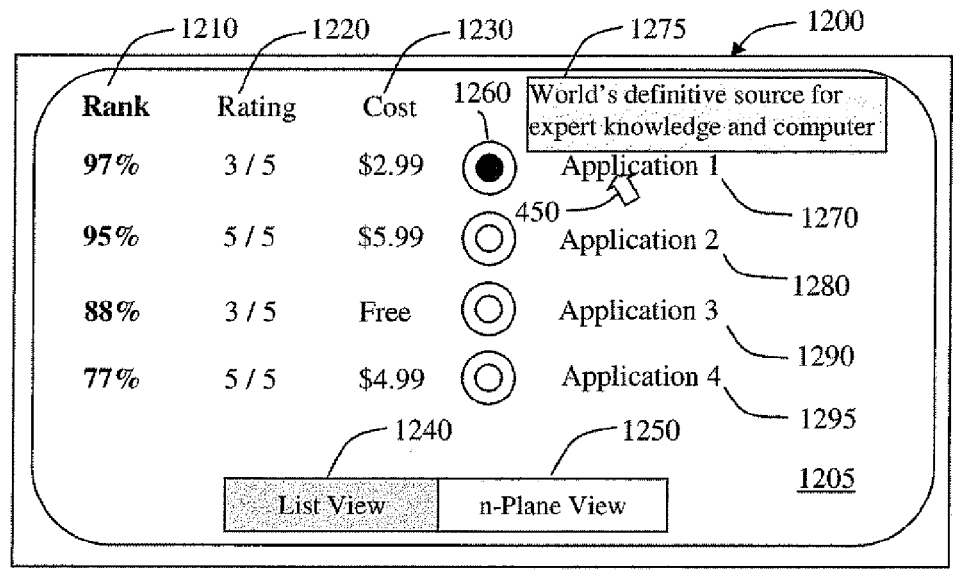
FIG. 12 depicts an example of a user interface for a system configured to display a listing of recommended user applications.
Figure 13:
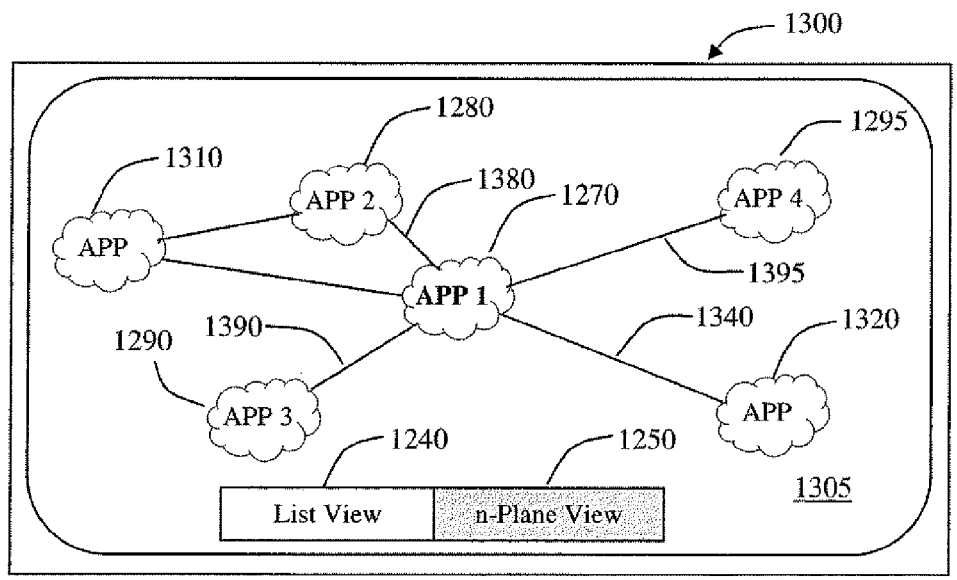
FIG. 13 depicts an example of a user interface for a system configured to display recommended user applications in a spatial view.
Figure 14:
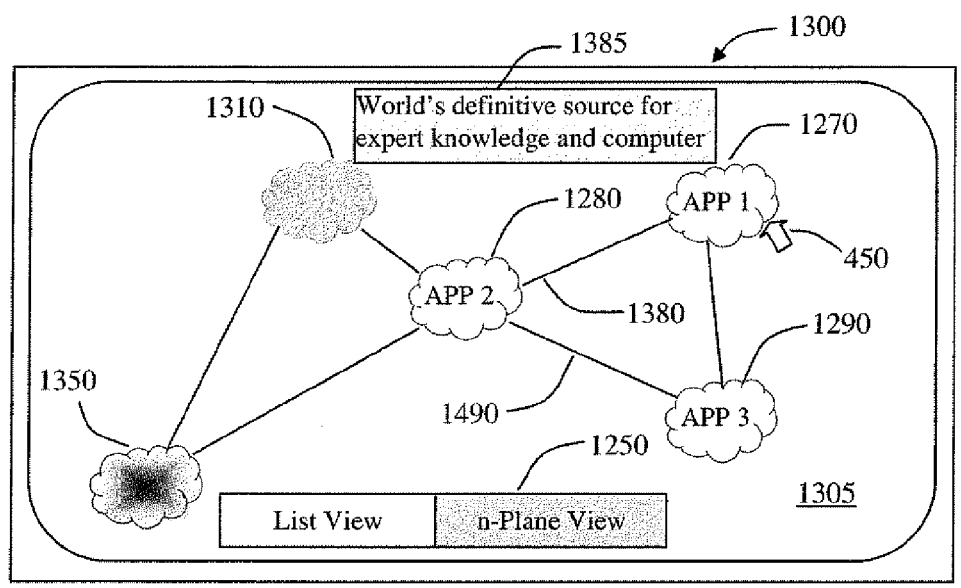
FIG. 14 depicts a further example of the user interface of FIG. 13 for a system configured to display recommended user applications in a spatial view.

Spatial view setting 480 and/or application list setting 490 may provide for a user preference of a type of format for displaying the recommended applications. An example of an application list format is illustrated in FIG. 12. Examples of a spatial view format are illustrated in FIGS. 13 and 14.

User interface 400 may be configured to display a plurality of icons 430, which may include user-selectable icons. Icons 430 may represent a plurality of electronic devices, including a television, a personal computer (PC), a smart-phone, a home controller, an audio system, a video system, a remote device, a wireless device, other types of electronic devices, or any combination thereof. Icons 430 may comprise a plurality of computer-generated graphical icons presented on user interface 400.

A pointing device 450 may be configured to select one or more of icons 430. Pointing device 450 may comprise a computer-generated graphical icon, or may be an optical pointing device, such as an LED or laser pointer. Display device 410 may be configured with optical receptors that detect light transmitted from pointing device 450 in order to identify a selected icon based on the position of the light on user interface 400. In some examples, display device 410 may comprise electrical sensors which may be configured to detect contact and/or touch, such as by a user's finger(s), based on a change in electrical current in a particular region of display device 410.

Electronic devices may be added and/or removed from icons 430 by selecting an Add icon 425. Selection of Add icon 425 may allow a user to select system settings, via display device 410, for a new device. The new device may be associated with an icon, an identifier, a name, a user, a login, access rights, device profile information, or any combination thereof. User interface 400 may comprise an authentication field 440 to authenticate that the user is authorized to manage and/or change the system settings associated with one or more of the electronic devices. In some examples, authentication field 440 may be configured to request a password. The authentication of the user may comprise, and/or be associated with, a user name, a password, a single sign on (SSO) service, a third party user authentication provider, other types of authentication, or any combination thereof.

One or more users may be designated by a user field 415. User field 415 may be configured to associate the one or more users with a selected device 420. In some examples, user field 415 may be used in conjunction with authentication field 440 to authenticate that the user is authorized to manage and/or change the system settings associated with selected device 420. System settings may be configured individually and/or differently for one or more devices associated with the same user. For example, a user may want to disable the system from reporting and/or saving any positional information associated with a particular device, such as selected device 420, out of privacy concerns.

One or both of user field 415 and authentication field 440 may be configured to allow the user to log into an account. The account may reside on one or more devices, such as selected device 420, in a server, at a service provider, in a cloud based storage system, or any combination thereof. The account may be accessible via the Internet. Additionally, the user may be able to remotely manage the system setting for one or more devices.

A plurality of devices associated with icons 430 may be commonly assigned and/or registered to a particular user. In some examples, user interface 400 may be configured to universally change the system settings for a plurality of devices associated with a particular user at the same time, such that all devices associated with the particular user may be associated with the same system settings. Additionally, all the user information associated with a particular device may be shared with other devices registered and/or assigned to the same user. In some examples, the system settings for the plurality of devices may be configured by a single device interacting with the system via user interface 400.

Figure 5A:
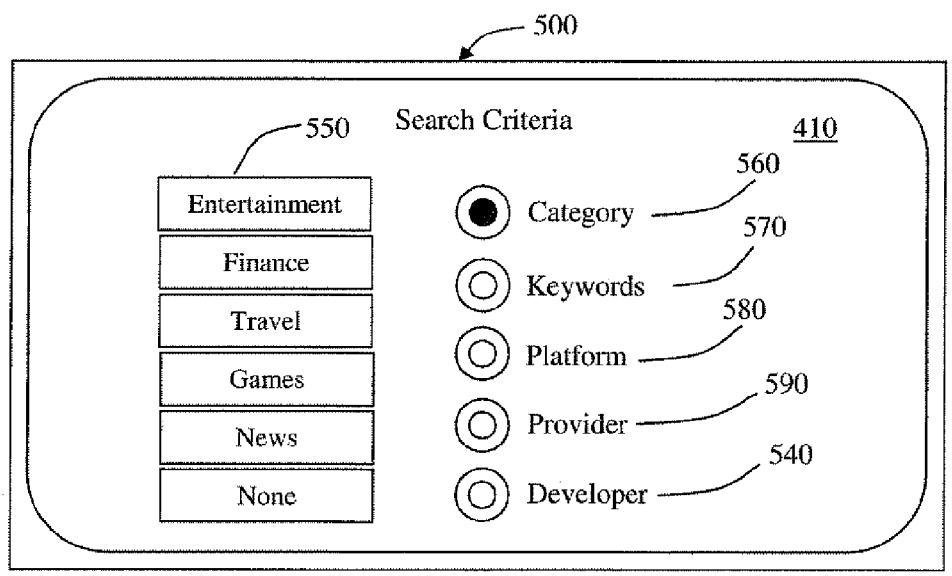
FIG. 5A depicts an example of a user interface for a system configured to recommend user applications according to a designated application category.

FIG. 5A depicts an example of a user interface 500 for a system configured to recommend user applications according to a designated application category. User interface 500 may be configured to provide a search tool for searching user applications. Additionally, user interface 500 may comprise one or more search criteria for performing the search. For example, the search criteria may include a category 560, keywords 570, a platform 580, a provider 590, and/or a developer 540. The search criteria may be used to perform a search for an application, filter search results, generate keywords, identify relevant application metadata, provide other search functionality, or any combination thereof.

The selection of category 560 may cause a listing of application categories 550 to appear on user interface 500, from which a category may be selected, designated, and/or identified. A selection of one or more application categories 550 may facilitate locating and/or selecting an application from a subset of, or smaller listing than, all of the available applications. In some examples, the user may select one or more of application categories 550 as part of requesting an application search. Applications may be recommended to the user based, at least in part, on an association of the recommended applications with one or more of application categories 550.

Application categories 550 may comprise any number of categories associated with an application. By way of non-limiting example, application categories 550 may comprise entertainment, finance, travel, games, news, books, lifestyle, utilities, education, business, reference, music, health and exercise, productivity, sports, social networking, other categories, or any combination thereof. In some examples, the user may select "none" in place of a designation of one or more application categories 550. The selection of "none" may cause the system to ignore any application category designation associated with one or more user applications. In some examples, the selection of "none" may cause the system to search all application categories 550. Additionally, the selection of "none" may operate to disable a search filter associated with application categories 550.

Figure 5B:
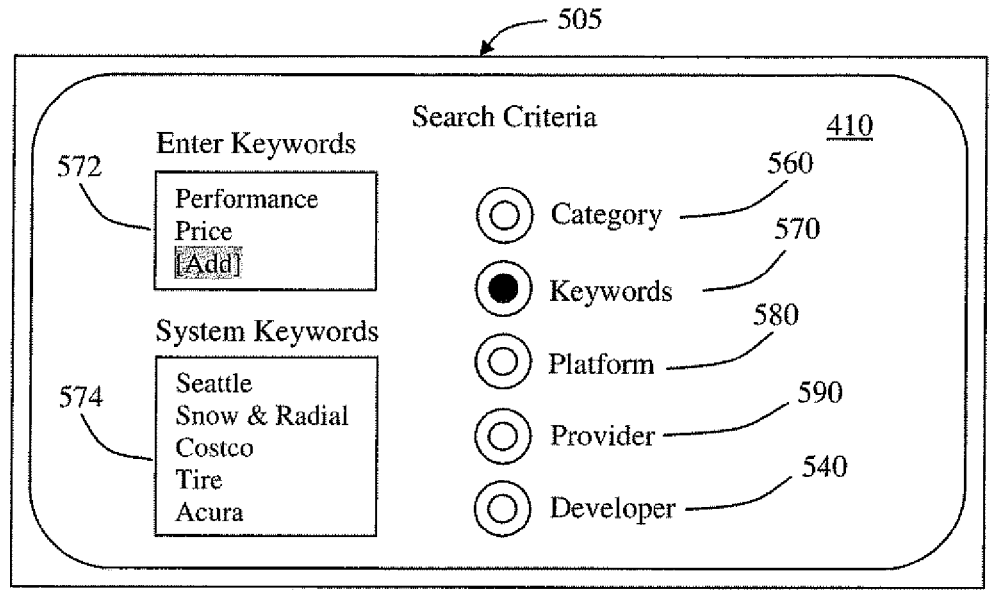
FIG. 5B depicts an example of a user interface for a system configured to recommend user applications according to one more designated keywords.

FIG. 5B depicts an example of a user interface 505 for a system configured to recommend user applications according to one more designated keywords. The selection of keywords 570 may cause one or more textboxes to appear in user interface 505, from which one or more keywords may be entered, selected, designated, and/or identified. A first textbox may comprise one or more user keywords 572. User keywords 572 may comprise one or more keywords entered, selected, designated, and/or identified by a user. A second textbox may comprise one or more system keywords 574. System keywords 574 may be generated, selected, designated, and/or identified by the system configured to recommend user applications.

User keywords 572 may be used to augment, refine, and/or vary the scope of system keywords 574 during a search for a user application. In some embodiments, the user may be able to edit and/or remove one of more keywords from system keywords 574. Boolean operators, rules, and/or scripts may be used together with the keywords to further refine the search for a user application. User keywords 572 and/or system keywords 574 may be optional. For example, the system may recommend one or more user applications without receiving any user keywords 572.

Figure 6:
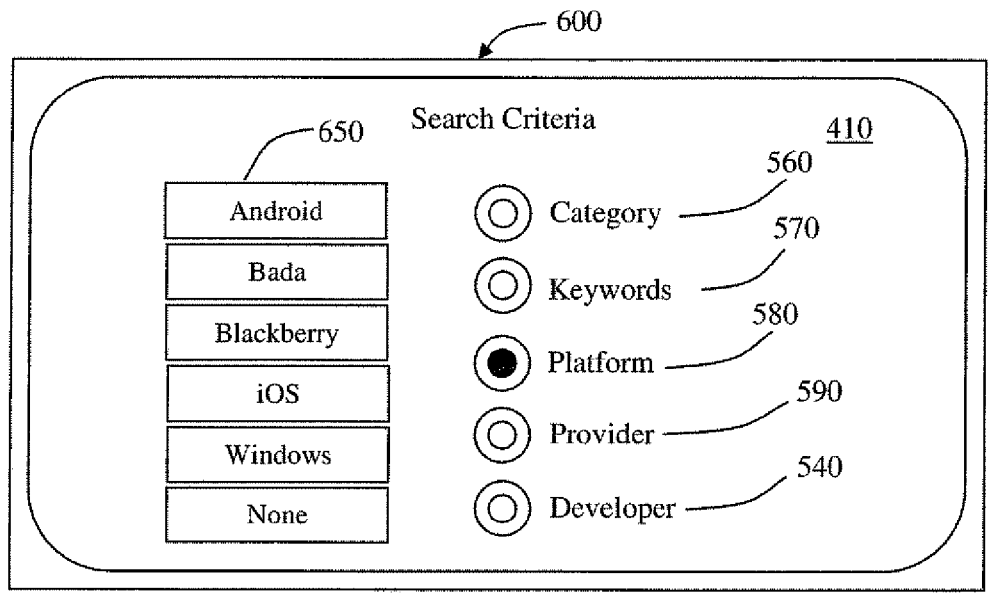
FIG. 6 depicts an example of a user interface for a system configured to recommend user applications according to a designated operating platform.

FIG. 6 depicts an example of a user interface 600 for a system configured to recommend user applications according to a designated operating platform. The selection of platform 580 may cause a listing of operating platforms 650 to appear on user interface 600, from which an operating platform may be entered, selected, designated, and/or identified. One or more of operating platforms 650 may comprise a collection of software and/or processing modules that may be configured to manage device hardware resources and/or provide services that may be associated with operating user applications.

A selection of one or more operating platforms 650 may facilitate locating and/or selecting an application from a subset of, or smaller listing than, all of the available applications. The user may select one or more of operating platforms 650 as part of requesting an application search. In some examples, a designated operating platform may be automatically selected according to a device that is associated with a user, such as selected device 420 (FIG. 4). Applications may be recommended to the user based, at least in part, on an association of the recommend applications with one or more of operating platforms 650. In some examples, an operating platform may be automatically detected and/or designated based on a device associated with a user, such as selected device 420 (FIG. 4).

Operating platforms 650 may comprise any number of operating platforms 650 associated with an application and/or user device. By way of non-limiting example, operating platforms 650 may be associated with a laptop computer, a personal computer, a smart-phone, a tablet, a PDA, a hand-held device, a television, an entertainment system, other types of user devices, or any combination thereof. In some examples, the user may select "none" in place of a designation of one or more operating platforms 650. The selection of "none" may cause the system to ignore any operating platform designation associated with one or more user applications. In some examples, the selection of "none" may cause the system to search all operating platforms 650. Additionally, the selection of "none" may operate to disable a search filter associated with operating platforms 650.

Figure 7:
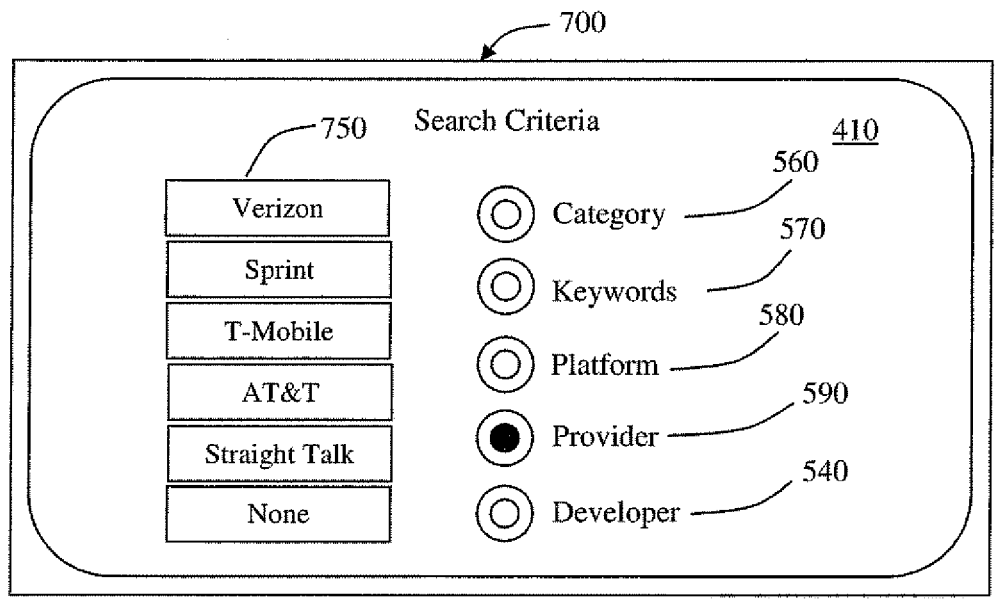
FIG. 7 depicts an example of a user interface for a system configured to recommend user applications according to a designated service provider.

FIG. 7 depicts an example of a user interface 700 for a system configured to recommend user applications according to a designated service provider. The selection of provider 590 may cause a listing of providers 750 to appear on user interface 700, from which a provider may be entered, selected, designated, and/or identified. One or more of providers 750 may comprise a service provider, a device manufacturer, a retail store, an on-line merchant, a distributer, other types of providers, or any combination thereof. By way of further example, one or more of providers 750 may comprise Best Buy, Amazon, Aptoide, GetJar, and/or other service providers not typically identified as being cellular service provider.

A selection of one or more providers 750 may facilitate locating and/or selecting an application from a subset of, or smaller listing than, all of the available applications. The user may select one or more of providers 750 as part of requesting an application search. In some examples, a designated provider may be automatically selected according to an existing service that is already being provided to a device, such as selected device 420 (FIG. 4). Applications may be recommended to the user based, at least in part, on an association of the recommended applications with one or more of providers 750.

By way of non-limiting example, providers 750 may be associated with a laptop computer, a personal computer, a smart-phone, a tablet, a PDA, a hand-held device, a television, an entertainment system, other types of user devices, or any combination thereof. In some examples, the user may select "none" in place of a designation of one or more providers 750. The selection of "none" may cause the system to ignore any provider designation associated with one or more user applications. In some examples, the selection of "none" may cause the system to search all providers 750. Additionally, the selection of "none" may operate to disable a search filter associated with providers 750.

Figure 8:
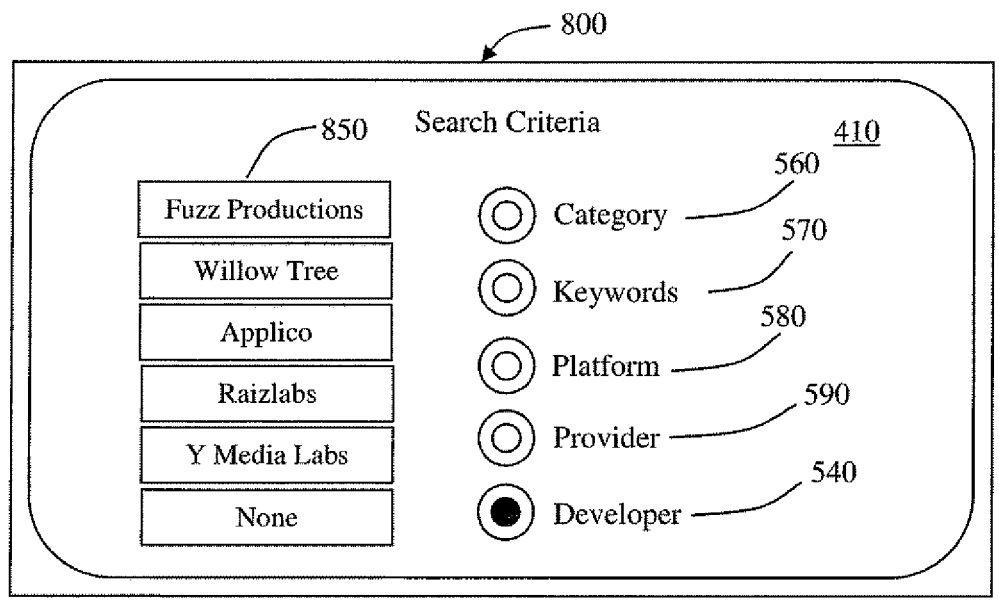
FIG. 8 depicts an example of a user interface for a system configured to recommend user applications according to a designated application developer.

FIG. 8 depicts an example of a user interface 800 for a system configured to recommend user applications according to a designated application developer and/or publisher. The selection of developer 540 may cause a listing of developers 850 to appear on user interface 800, from which a provider may be entered, selected, designated, and/or identified. One or more of developers 850 may comprise a software developer, a user application developer, a hardware developer, other types of developers, or any combination thereof.

A selection of one or more developers 850 may facilitate locating and/or selecting an application from a subset of, or smaller listing than, all of the available applications. The user may select one or more of developers 850 as part of requesting an application search. Applications may be recommended to the user based, at least in part, on an association of the recommend applications with one or more of developers 850.

By way of non-limiting example, developers 850 may be associated with a laptop computer, a personal computer, a smart-phone, a tablet, a PDA, a hand-held device, a television, an entertainment system, other types of user devices, or any combination thereof. In some examples, the user may select "none" in place of a designation of one or more developers 850. The selection of "none" may cause the system to ignore any developer designation associated with one or more user applications. In some examples, the selection of "none" may cause the system to search all developers 850. Additionally, the selection of "none" may operate to disable a search filter associated with developers 850.

Figure 9A:
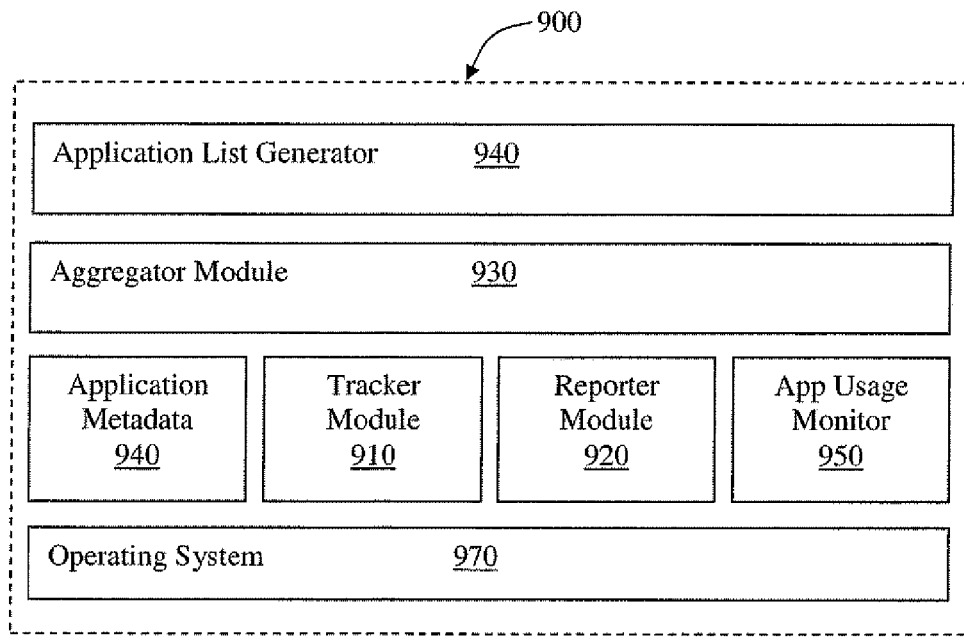
FIG. 9A depicts a block diagram of an example of a system comprising operational modules configured to recommend user applications.

FIG. 9A depicts a block diagram of an example of a system 900 comprising operational modules configured to recommend user applications. System 900 may comprise a tracker module 910, a reporter module 920, an aggregator module 930, an application list 940, an application usage module 950, application metadata 960, and/or an operating system 970. In some examples, system 900 may comprise software modules.

Tracker module 910 may comprise one or more sources of data collection and/or data sets. The data may comprise user information associated with one or more users. In some examples, tracker module 910 may comprise, or may be configured to obtain information from, a location monitor, a schedule observer, a usage monitor, a behavior monitor, an application monitor, other sources of information, and/or any combination thereof. The information may comprise user information associated with a user and/or with usage of an electronic device.

Tracker module 910 may be configured to obtain and/or determine a user's current location based, at least in part, on a location associated with an electronic device. For example, the location may be obtained from a location monitor and/or a location monitoring device. The location monitor may be configured to determine and/or indicate a position of the electronic device indoors and/or outdoors. The user's current location may be used to identify points of interest in proximity to the electronic device, such as merchants, tourist attractions, restaurants, financial institutions, other users, other electronic devices, wireless access points, geographic features, trails, roads, addresses, buildings, businesses, residences, vehicles, other points of interest, or any combination thereof. By way of further example, the user's current location could be used to identify the location of a book in a library and/or the location of particular item in a store. Other points of interest may include a room in an office building or a residence, such as a conference room, an office room, an auditorium, a reception desk, a parking space, a garage, a restroom, a kitchen, a dining room, a bedroom, other types of rooms, or any combination thereof.

Additionally, tracker module 910 may be configured to obtain and/or monitor one or more appointments, meetings, tasks, jobs, dates, parties, gatherings, concerts, other types of events, or any combination thereof. For example, tracker module 910 may be configured to monitor a user's calendar or appointment schedule, via a schedule observer, to determine one or more events that have occurred, are occurring, and/or may be scheduled to occur. Tracker module 910 may identify one or more other users who may be associated with an event. In some examples, tracker module 910 may be configured to monitor events associated with more than one device and/or to monitor events associated with a particular location.

A user's behavior may also be monitored according to how the user operates the electronic device. For example, tracker module 910 may be configured to obtain and/or monitor how a user operates a smart-phone, including what times of day the smart-phone is operated, how often the smart-phone is used, where the smart-phone is used, whether or not a voice-assist feature is used, what spoken language is used, whether the user travels internationally, other types of user's behavior, or any combination thereof. Tracker module 910 may be configured to monitor user information, via a usage monitor, according to interactions of the user with a graphic user interface.

Additionally, tracker module 910 may be configured to obtain and/or monitor how the user operates previously installed applications. For example, tracker module 910 may identify a first application that the user operates, and may compare the first application with a second application. Functions and/or options associated with the first application that may be different than the functions and/or options associated with second application may be identified to determine a user preference. The user preference may comprise a preference for a voice control, a keyboard, a scrolling mechanism, an application developer, a purchase price, a language, a media type, a software compatibility, a multi-user mode, an anonymous mode, a confidentiality mode, a security access, an age designation, an age recommendation, an age restriction, an application category, other types of user preferences, or any combination thereof. The user preference may be used to generate one or more keywords.

The user preferences, as monitored by a usage monitor, may be associated with different user environments and/or with different user modes of operation. For example, a first user environment may be associated with a user's place of business and/or a user's profession, and a second user environment may be associated with a user's place of residence and/or a user's private life. The system may process the user preferences differently according to which user environment is currently associated with the user. In some examples, the user environment may be determined according to the current location of the electronic device. For example, the user may associate a personal residence with a first geographic location, and a place of business with a second geographic location. Additionally, different electronic devices may be associated with different user environments. For example, a first cell phone may be designed as a business phone, and a second cell phone may be designated as a personal phone. Different types of applications may be recommended according to which user environment is associated with the particular electronic device.

The information and/or data obtained by tracker module 910 may be provided in one or more formats, computer languages, software protocols, software versions, communication layers, data structures, media, other types of formats, or any combination thereof. In some examples, tracker module 910 may be configured to combine information from sources which may otherwise be unable to communicate directly with each other and/or may be unaware of each other. Additionally, the information provided by one or more of the sources may be of varying quality, quantity, and/or reliability, and tracker module 910 may be configured to evaluate the sources and/or process the information according to a rating assigned to one of more of the sources.

Reporter module 920 may be configured to process the information obtained by tracker module 910. For example, reporter module 920 may be configured to gather user information obtained by tracker module 910 and to generate keywords based, at least in part, on the user information.

Keywords may be generated, by reporter module 920, based on a location of the user, an event associated with the user, a schedule associated with the user, a behavior of the user, other types of user information, or any combination thereof. In some examples, one or more keywords may be provided by the user via a user interface, such as user keywords 572 of user interface 505 (FIG. 5B), and/or via a user activated voice interface. Additionally, keywords may be generated by the system, such as system keywords 574 of user interface 505 (FIG. 5B) and/or based on prior searches. The results of a first search may be used to refine and/or generate keywords for a second search. A history of the keywords used for searches may be stored, and the previously used keywords may be weighted according to the number of times that the keywords have been used and/or based on their relevance in identifying applications that were subsequently selected.

Keywords may be associated with a relevance rating. The relevance rating may be used as a weighting factor to identify a corresponding relevance of the keywords in performing a search for an application. Additionally, keywords may be associated with a trending ability. The relevance rating and/or trending ability may be used as a weighting factor to identify a corresponding relevance of the keywords in performing a search for an application. For example, the keywords may be associated with one or more general trends such as "hot", "getting hot", "getting cold", and "cold". The trend of "hot" may indicate that the relevance of the keyword is relatively high, whereas the trend of "cold" may indicate that the relevance of the keyword is relatively low.

Application usage module 950 may be configured to track and/or obtain user information from a plurality of users, including one or more anonymous users. The one or more anonymous users may be associated with keywords and/or applications from prior application searches. Additionally, application usage module 950 may be configured to monitor a general user behavior for the plurality of users in order to build a knowledge base for performing application searches. In some examples, anonymous user usage data may be stored on one or more servers and/or analyzed according to principles associated with "Big Data" analytics.

Application metadata module 960 may be associated with, and/or may comprise, a repository of information associated with one or more applications. For example, application metadata module 960 may be associated with a description of the application, one or more keywords, user comments, an installation base, a voice control, a keyboard, a scrolling mechanism, an application developer, a purchase price, a language, a media type, a software compatibility, a multi-user mode, an anonymous mode, a confidentiality mode, a security access, an age designation, an age recommendation, an age restriction, an application category, other types of metadata, or any combination thereof.

Aggregator module 930 may be configured to collect keywords from reporting module 920. Additionally, aggregator module 930 may be configured to instruct tracker module 910 as to what types of user information may be monitored. In some examples, aggregator module 930 may be configured to obtain information from application usage module 950 and/or access the metadata associated with application metadata module 960. Based, at least in part, on the information obtained from one or more of the other modules, aggregator module 930 may be configured to generate application list 940. Application list 940 may be displayed, and/or otherwise presented, to the user as a search result. Application list 940 may be provided to one or more other service providers. For example, a third party service party may query aggregator module 930 for a user application recommendation. In some examples, the application list 940 may include applications which may be downloaded from one or more application stores.

Aggregator module 930 may be configured to obtain user information from a plurality of tracker modules. The plurality of tracker modules may be associated with a plurality of devices. In some examples, the plurality of devices may be associated with, and/or registered with, the same user. The user information obtained from the plurality of devices may be used to determine the collective behavior and/or overall preferences of the user across a number of different operating platforms and/or devices.

System 900 may comprise instructions for, or be configured to, identify user information associated with a user's behavior. The user behavior may be related to usage of an existing, or previously installed, user application, and the user information may comprise information associated with the usage of the existing user application.

Keywords may be generated based, at least in part, on the user information. Additionally, the keywords may be compared to metadata associated with user applications, and the user applications may be prioritized according to a correlation of the metadata with the keywords based, at least in part, on said comparing.

A user preference associated with the existing user application may be identified, and the user applications may be prioritized according to which of the user applications include the user preference. In some examples, a setting on the existing user application may be identified, and the user applications may be prioritized according to which of the user applications also include the setting.

The existing user application may comprise a voice activated feature, and the user applications may be prioritized according to which of the user applications include voice activation. Additionally, the existing user application may comprise a privacy setting feature, and the user applications may be prioritized according to which of the user applications also include a privacy setting.

In some examples, the existing user application may comprise a scheduling application, and the user information may comprise a scheduled event. Keywords may be associated with the scheduled event. One or more prioritized user applications may be displayed prior to, or during, the scheduled event.

Figure 9B:
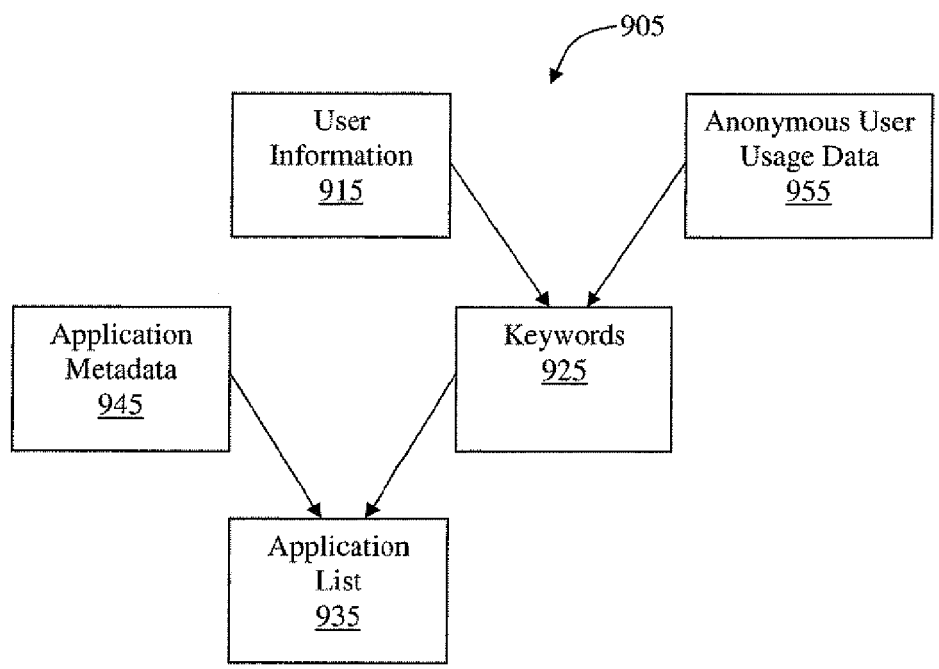
FIG. 9B depicts a flow chart of an example data structure associated with a system configured to recommend user applications.

FIG. 9B depicts a flow chart of an example data structure 905 associated with a system configured to recommend user applications based, at least in part, on user information 915 and anonymous user usage data 955. User information 915 may be obtained for a particular user. User information 915 may be obtained from a device associated with the particular user and/or may be based on behavior associated with the particular user. Anonymous user usage data 955 may comprise information obtained for one or more anonymous users. Additionally, anonymous user usage data 955 may be obtained from devices associated with the one or more anonymous users and/or may be based on behavior associated with the one or more anonymous users.

User information 915 and anonymous user usage data 955 may be combined, processed, compared, and/or otherwise operated on to determine one or more keywords 925. In some examples, keywords 925 may be generated based, at least in part, on both user information 915 and anonymous user usage data 955.

Application metadata 945 may be associated with one or more user applications. Additionally, application data 945 may comprise a description of a user application. For example, application data 945 may include information associated with the user application, including a category, one or more keywords, a platform, a provider, a developer, other descriptors, or any combination thereof.

Keywords 925 and application metadata 945 may be combined, processed, compared, and/or otherwise operated on to determine an application list 935. In some examples, application list 935 may be generated based, at least in part, on a degree of correlation between keywords 925 and application metadata 945.

Figure 10:
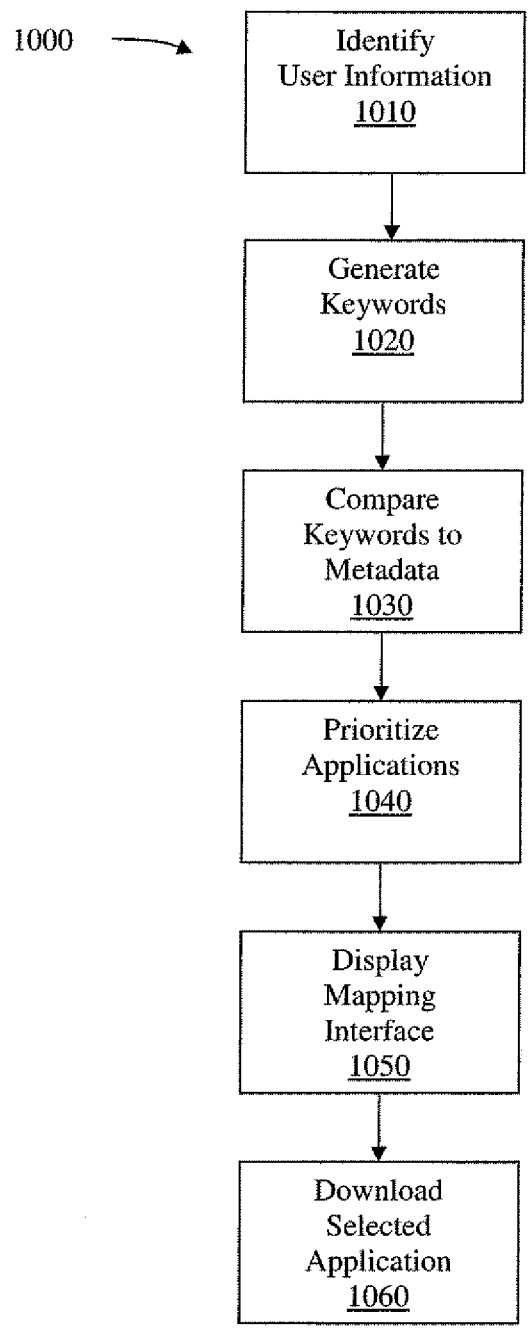
FIG. 10 depicts an example of a process for recommending user applications.

FIG. 10 depicts an example of a process 1000 for recommending user applications. At operation 1010, user information may be identified. The user information may be associated with user behavior.

At operation 1020, keywords may be generated based, at least in part, on the user information. The user information may comprise a user location, and the keywords may be associated with points of interest corresponding with the user location. In some examples, the points of interest may comprise a merchant associated with a category of service, and the user applications may be directed to the category of service to be displayed. The merchant may be located near the user location, and a user application associated with the merchant may be displayed. Additionally, the user information may comprise an event scheduled on a calendar, and the keywords may be generated based, at least in part, on a description of the event.

At operation 1030, the keywords may be compared to metadata associated with user applications. In some examples, the keywords may be compared to the metadata in response to identifying the user's location.

At operation 1040, the user applications may be prioritized according to a correlation of the metadata with the keywords based, at least in part, on the comparison made at operation 1030. For example, the user information may comprise previous usage of a voice-activated application, and the user applications may be prioritized based, at least in part, on which of the user applications include voice-activated features.

At operation 1050, the prioritized user applications may be displayed using a mapping interface. The mapping interface may comprise individual applications that may be visually connected to multiple other applications according to the correlation of the metadata. The mapping interface may be configured to display the prioritized user applications in a planar view comprising radial connections emanating from one or more of the individual applications. In some examples, the individual applications may be color coded to indicate a degree of the correlation. The prioritized user applications may be downloaded to a user device, for user selection. At operation 1060, the selected user application may be downloaded to the user device.

The exemplary process 1000 depicted by FIG. 10, and the associated operations described therein, may be performed by one or more processing devices, apparatus, and/or systems depicted by any of the figures in, or otherwise disclosed by, this specification.

Figure 11:
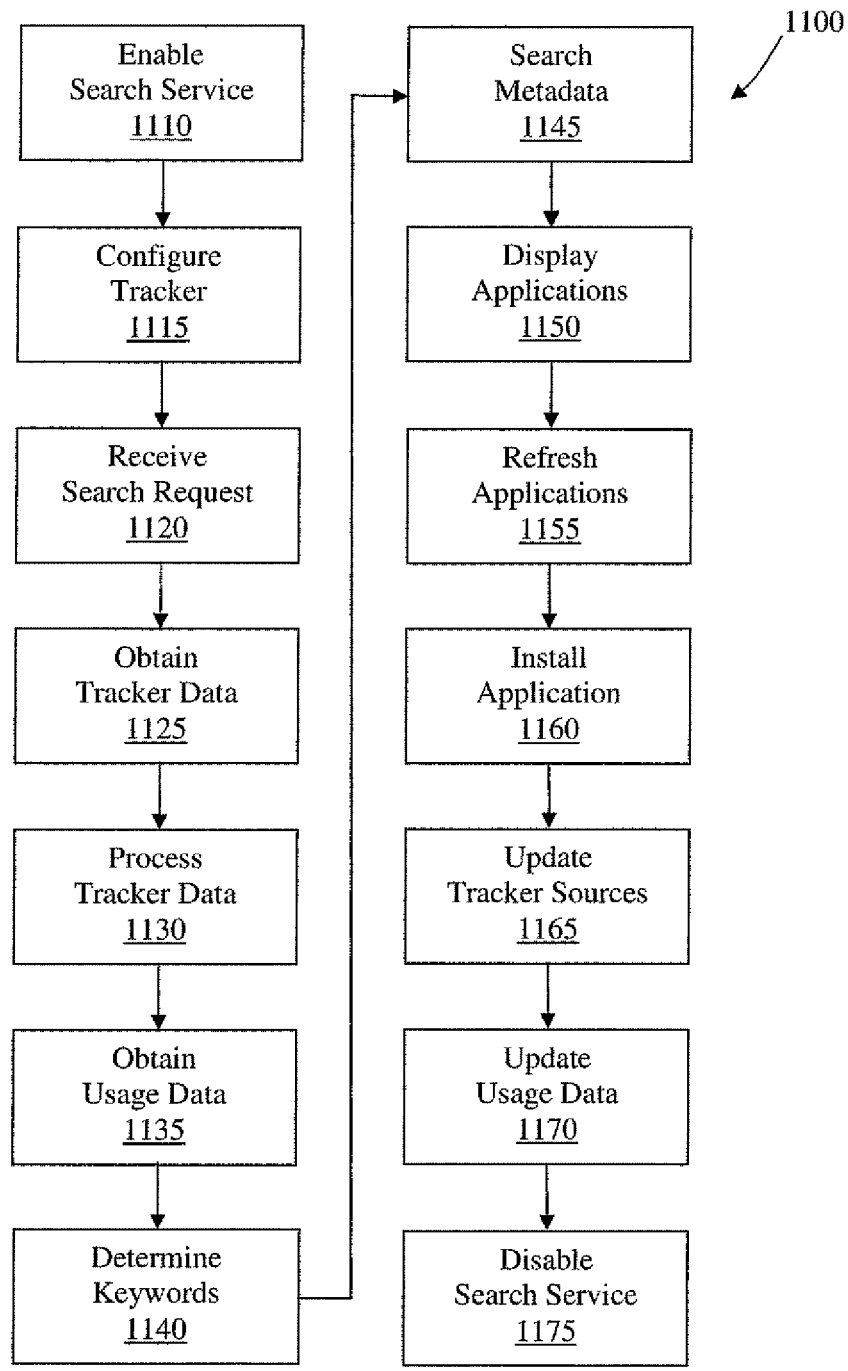
FIG. 11 depicts a further example of a process for recommending user applications.

FIG. 11 depicts a further example of a process 1100 for recommending user applications. At operation 1110, a service associated with searching for one or more user applications may be enabled. The service may comprise an automated request for an application. In some examples, the service may comprise a monitoring service for monitoring user information associated with a user and/or a user's device. The service may be enabled in response to the detection of a particular type of event and/or user behavior. In some examples, the service may be explicitly enabled via a user interface.

At operation 1115, a tracking service may be configured. The tracking service may comprise options for selecting what types of user information may be monitored.

At operation 1120, a search for one or more user applications may be requested. The request may comprise an explicit request made by the user. In some examples, the request may comprise an automated request that may be triggered and/or initiated in response to the detection of a particular type of event and/or user behavior.

At operation 1125, information associated with the tracking service may be obtained. For example, the information may comprise user information associated with a user.

At operation 1130, the information associated with tracking service may be processed. In some examples, the information may be processed according to a relevance weighting of the user information, a trending ability of the user information, and/or according to prior search results.

At operation 1135, usage data associated with one or more users may be obtained. The one or more users may comprise one or more other users, the identity of which may remain anonymous.

At operation 1140, one or more keywords may be obtained based, at least in part, on one or both of the information obtained at operation 1130 and the usage data obtained at operation 1135.

At operation 1145, application metadata may be searched and/or compared with the keywords obtained at operation 1140. For example, words associated with the application metadata may be compared with the keywords to determine a relevance of a particular application with the keywords.

At operation 1150, a plurality of applications may be displayed on a user device. The displayed applications may comprise a listing of applications and/or a graphic display of the applications. The applications may be displayed according to a priority of relevance rating.

At operation 1155, the displayed applications may be refreshed. In some examples, the displayed applications may be refreshed based, at least in part, on new user information and/or usage data that may have been received after the applications were initially displayed. A new priority and/or relevance rating may be determined for the applications. The arrangement of the applications may be revised and/or resorted based on the new priority and/or relevance rating.

At operation 1160, an application selected from the displayed applications may be installed. The application may be installed in response to the detection of a particular type of event and/or user behavior. In some examples, an application may be installed automatically without displaying any applications to the user at operation 1150 and/or without refreshing the displayed application at operation 1155.

At operation 1165, information associated with one or more tracking sources and/or tracking services may be updated for a particular user. Additionally, at operation 1170, usage data associated with a plurality of users may be updated. The updated information and/or updated usage data may be used to perform additional searches for the user and/or for other users. At operation 1175, the service associated with searching for one or more user applications may be disabled. The service may be disabled in response to the selection and/or installation of a selected application. In some examples, the service may be explicitly disabled via a user interface.

The exemplary process 1100 depicted by FIG. 11, and the associated operations described therein, may be performed by one or more processing devices, apparatus, and/or systems depicted by any of the figures in, or otherwise disclosed by, this specification.

FIG. 12 depicts an example of a user interface 1200 for a system configured to display a listing of recommended user applications. User interface 1200 may be displayed by a display device 1205 which may comprise a television, a monitor, a smart-phone, a plasma screen, a LCD screen, a projection screen, other types of display devices, or any combination thereof. One or more controllers may be configured to provide user control of display device 1205, or to utilize display device 1205 as a user interface for operating a user application.

User interface 1200 may comprise a listing of applications in a list view 1240, including any number of applications such as a first application 1270, a second application 1280, a third application 1290, and/or a fourth application 1295. The listing of applications may further comprise a selection control 1260 which may be configured to select one or more of the applications.

Each of the applications may be associated with one or more application identifiers, such as a relevance ranking 1210, a rating 1220, and/or a cost 1230. In some examples, the listing of applications may be sorted according to relevance ranking 1210. Additionally, the user may sort the listing of applications according to one or more of the other application identifiers.

In addition to list view 1240, user interface 1200 may comprise a spatial view 1250, or "n-plane" view. The user may select and/or toggle between list view 1240 and spatial view 1250. In some examples, a description and/or name of an application, such as first application 1270, may appear as a text box 1275 when pointing device 450 is located on and/or near first application 1270.

FIG. 13 depicts an example of a user interface 1300 for a system configured to display recommended user applications in spatial view 1250. For example, spatial view 1250 may comprise one or more planes of view, including planes defined by geometric dimensions, inferential dimensions, and/or temporal dimensions. From user interface 1300, the user may select and/or toggle between spatial view 1250 and list view 1240 on a display device 1305.

Spatial view 1250 may be configured to display first application 1270, second application 1280, third application 1290, fourth application 1295, in addition to other applications such as application 1310 and application 1320. One or more of the applications may be shown as being separated from another application by a distance. For purposes of illustration the distance may be shown by a connection. For example, first application 1270 may be separated from application 1320 by a first connection 1340, first application 1270 may be separated from second application 1280 by a second connection 1380, first application 1270 may be separated from third application 1290 by a third connection 1390, and first application 1270 may be separated from fourth application 1295 by a fourth connection 1395.

Spatial view 1250 may be configured to illustrate a degree of relevancy of the applications displayed on user interface 1300. For example, spatial view 1250 may be configured to take into account the likelihood that a particular application may be relevant based, at least in part, on user information associated with the user. Additionally, the relevance of the applications, as illustrated by the connections, may be based on statistical measures, such as how many downloads of the application have occurred, and/or which category the application belongs too.

As previously discussed, keywords may be generated based, at least in part, on the user information. The keywords may be compared to metadata associated with user applications, and the user applications may be prioritized according to a correlation of the metadata with the keywords based, at least in part, on the comparison. Spatial view 1250 may be configured to display the prioritized user applications to visually depict the correlation. Additionally, the correlation may be visually depicted by one or more connections linking each of the prioritized user applications to one or more other user applications.

The relative length of the connections may correspond with the level of correlation. For example, second connection 1380 may be illustrated as being shorter than both third connection 1390 and fourth connection 1395. Accordingly, in some examples, second application 1280 may be associated with a higher correlation and/or higher degree of relevance to the user's user information than third application 1290 and/or fourth application 1295. In some examples, the relative lengths of the connections may indicate a similarity in metadata as between applications, such that second application 1280 may comprise metadata which may be considered most similar to the metadata associated with first application 1270.

The one or more connections may be configured to link user applications associated with metadata comprising one or more of the same keywords. The user applications may be prioritized according to a number of the connections. In some examples, a first user application having a greater number of connections is associated with a higher priority than a second user application associated with a fewer number of connections.

The relevancy of user applications displayed on user interface 1300 may be based, at least in part, on which applications comprise one or more related features. For example, a feature associated with an installed user application may be identified, and the user applications may be prioritized based, at least in part, on which of the user applications also include the feature. The feature used for determining the relevancy of the application may be identified based, at least in part, on a frequency of use associated with the installed user application. User applications which include the feature may be visually linked together on user interface 1300.

FIG. 14 depicts a further example of the user interface 1300 of FIG. 13 for a system configured to display recommended user applications in spatial view 1250. The user may select one or more of the applications, such as second application 1280. Upon the selection of an application, user interface 1300 may be configured to refresh the search results. In one example, the selected application may appear to move towards the center of user interface 1300 to visually indicate that second application 1280 was selected. The selected application may not be installed, but only used to relocate the plurality of applications on user interface 1300.

Additionally, the selection of an application may revise and/or refresh the keywords and/or metadata associated with the search. In some examples, the graphical depiction of the applications may be refreshed and/or updated based on newly received user information and/or application usage without any explicit request from the user to refresh and/or update user interface 1300.

Based on the user's selection of a different application, one or more connections may appear longer or shorter than in FIG. 13. For example, second connection 1380 is illustrated as being longer in FIG. 14 as compared to FIG. 13. On the other hand, application 1310 is illustrated as being closer to second application 1280 in FIG. 14 as compared to FIG. 13. In some examples, new connections, such as connection 1490, may be generated based, at least in part, on the selection of an application, such as second application 1280 in FIG. 13. In some examples, a description and/or name of an application, such as first application 1270, may appear as a text box 1385 when pointing device 450 is located on and/or near first application 1270.

The different priorities, relevancies, and/or correlations associated with the user applications may be depicted as color coded icons on user interface 1300. An icon associated with one or more of the applications, such as application 1310, may appear darker or lighter than other applications, such as another application 1350. In some examples, icons which appear as being lighter may be considered as having a higher priority, relevance, and/or correlation with the search. User interface 1300 may be configured to be responsive to multi-touch gestures, including tapping display device 1305 to select an icon, and/or using "spread and pinch" gestures to zoom and/or select an area of user interface 1300 for viewing.

Instead of, or in addition to, providing recommendations for user applications that may be installed on an electronic device, one or more of the devices, apparatus, systems, methods, user interfaces, and/or operations disclosed herein may be used to recommend a service, a service provider, a good, a manufacturer, a distributor, or any combination thereof. The goods and/or services recommended to the user may include a restaurant, a hotel, an airline, a car, a rental company, a financial institution, an investment, clothing, an electronic device, an appliance, a repair shop, an attorney, a doctor, a hospital, a plumber, an electrician, a store, a movie, a song, equipment, a vacation, other types of services and/or goods, or any combination thereof.

The system and apparatus described above may use dedicated processor systems, microcontrollers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device that may be configured to interface with a networked system, locally and/or remotely, via a wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long as the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of various examples, it should be apparent that the examples may be modified in arrangement and detail without departing from such principles. We claim all modifications and variations coming within the spirit and scope of the following claims.

The invention claimed is:

1. A method comprising:
    identifying, by a processing device, user information associated with user behavior interacting with user applications on the processing device;
    generating, by the processing device, keywords based, at least in part, on the user information;
    generating, using the processing device, a list of user applications available from an application provider based, at least in part, on comparing the keywords to metadata associated with the user applications;
    prioritizing, by the processing device, the usr applications from the list according to a correlation of the metadata with the keywords to generate a prioritized list of user applications; and
    displaying, by the processing device using a mapping interface, the prioritized list of user applications arranged in a planar view in which at least one of the user applications of the prioritized list comprises a visual radial connection to at least another of the user applications of the prioritized list based, at least in part, on the correlation.

2. The method of claim 1, wherein said identifying comprises identifying a location of the processing device; and wherein the keywords are associated with points of interest corresponding with the location of the processing device.

3. The method of claim 2, wherein the points of interest comprise a merchant associated with a category of service; and wherein the method further comprises displaying, by the processing device, the user applications from the prioritized list corresponding to the merchant.

4. The method of claim 2, wherein the points of interest comprise a merchant located near the location of the processing device; and wherein the method further comprises displaying, by the processing device, the user applications from the prioritized list corresponding to the merchant.

5. The method of claim 2, wherein the keywords are compared to the metadata in response to identifying the location of the processing device.

6. The method of claim 1, wherein the user information comprises an event scheduled on a calendar; and wherein the keywords are generated based, at least in part, on a description of the event.

7. The method of claim 1, wherein the user information comprises previous usage of a voice-activated application; and wherein the user applications are prioritized based, at least in part, on which of the user applications include voice-activated features.

8. The method of claim 1, wherein the individual applications are color coded to indicate a degree of the correlation.

9. A memory device having instructions stored thereon that, in response to execution by a processing device, cause the processing device to perform operations comprising:
    identifying user information associated with user behavior interacting with the processing device; generating keywords based, at least in part, on the user information; comparing the keywords to metadata associated with user applications available from an application provider to generate a list of applications; prioritizing the user applications on the list of applications according to a correlation of the metadata with the keywords to generate a prioritized list of user applications; and displaying, using a mapping interface, the prioritized list of user applications on the processing device arranged in a planar view in which at least one of the user applications on the prioritized list comprises a visual radial connection to at least another of the user applications on the prioritized list based, at least in part, on the correlation.

10. The memory device of claim 9, wherein said identifying comprises identifying one or more points of interest in proximity to the processing device; and wherein the keywords are associated with the one or more points of interest.

11. The memory device of claim 10, wherein the one or more points of interest comprise a merchant; and wherein said prioritizing comprises assigning a higher priority to a user application on the prioritized list associated with the merchant.

12. The memory device of claim 11, wherein the metadata comprises a tag that identifies the merchant.

13. The memory device of claim 11, wherein the at least one of the user applications on the prioritized list comprises a service provided by the merchant.

14. The memory device of claim 10, wherein the one or more points of interest comprise an electronic device; and wherein the keywords identify the electronic device.

15. The memory device of claim 14, wherein the electronic device comprises a consumer appliance.

16. The memory device of claim 15, wherein at least one of the user applications on the prioritized list is associated with a method of using the consumer appliance.

17. The memory device of claim 15, wherein the consumer appliance is associated with a category of goods; and wherein the keywords comprise the category of goods.

18. The memory device of claim 14, wherein the operations further comprise causing the user applications on the prioritized list to be displayed on the processing device in response to identifying that the electronic device is in proximity to the processing device.

19. An apparatus, comprising: a memory device configured to store instructions; and a processing device that, in response to executing the instructions stored in the memory device, is configured to: identify user information associated with user behavior interacting with at least one existing user application stored on the apparatus; generate keywords based, at least in part, on the user information; compare the keywords to metadata associated with user applications available from an application provider to generate a list of user applications; prioritize the user applications on the list according to a correlation of the metadata with the keywords to generate a prioritized list of user applications; and display, using a mapping interface, the prioritized list of user applications arranged in a planar view in which at least one of the user applications on the prioritized list comprises a visual radial connection to at least another of the user applications on the prioritized list based, at least in part, on the correlation.

20. The apparatus of claim 19, wherein the processing device is further configured to monitor the user behavior related to usage of the at least one existing user application.

21. The apparatus of claim 20, wherein said identifying comprises identifying a user preference associated with the at least one existing user application; and wherein the user applications on the prioritized list are prioritized based, at least in part on, the user preference.

22. The apparatus of claim 20, wherein said identifying comprises identifying a setting on the at least one existing user application; and wherein the user applications on the prioritized list are prioritized based, at least in part, on the setting.

23. The apparatus of claim 20, wherein the usage comprises a voice activated feature of the at least one existing user application; and wherein the user applications on the prioritized list are prioritized based, at least in part, on the voice activated feature.

24. The apparatus of claim 20, wherein the usage comprises a privacy setting of the existing user application; and wherein the user applications on the prioritized list are prioritized based, at least in part, on the privacy setting.

25. The apparatus of claim 20, wherein the at least one existing user application comprises a scheduling application; and wherein the user information comprises a scheduled event.

26. The apparatus of claim 25, wherein the keywords are associated with the scheduled event.

27. The apparatus of claim 25, wherein the processing device is further configured to cause user applications on the prioritized list to be displayed prior to the scheduled event.

28. The apparatus of claim 25, wherein the processing device is further configured to cause one or more of the user applications on the prioritized list to be displayed during the scheduled event.

\* \* \* \* \*